United States Patent
Haghighat-Kashani et al.

(10) Patent No.: US 9,369,782 B2
(45) Date of Patent: Jun. 14, 2016

(54) ON-BOARD FEATURE EXTRACTION AND SELECTION FROM HIGH FREQUENCY ELECTRICITY CONSUMPTION DATA

(71) Applicant: Energy Aware Technology Inc., Vancouver (CA)

(72) Inventors: Ali Haghighat-Kashani, Vancouver (CA); Zhenyu Guo, Vancouver (CA)

(73) Assignee: Neurio Technology Inc., Vancouver (CA)

( * ) Notice: Subject to any disclaimer, the term of this patent is extended or adjusted under 35 U.S.C. 154(b) by 119 days.

(21) Appl. No.: 14/489,228

(22) Filed: Sep. 17, 2014

(65) Prior Publication Data

US 2016/0080840 A1 Mar. 17, 2016

(51) Int. Cl.
*G08C 15/06* (2006.01)
*H04Q 9/00* (2006.01)

(52) U.S. Cl.
CPC ............. *H04Q 9/00* (2013.01); *H04Q 2209/60* (2013.01)

(58) Field of Classification Search
CPC .. G06Q 50/06; H02J 13/001; H02J 2003/003; H02J 2003/143; Y02B 90/246; G01D 4/004; G01R 19/2513; G01R 22/063; G05B 15/02
See application file for complete search history.

(56) References Cited

U.S. PATENT DOCUMENTS

| 8,560,134 | B1 | 10/2013 | Lee | |
|---|---|---|---|---|
| 9,104,189 | B2 * | 8/2015 | Berges Gonzalez ... | G01D 4/004 |
| 2011/0307200 | A1 | 12/2011 | Hsu et al. | |
| 2012/0016608 | A1 * | 1/2012 | Ko ......................... | G01D 4/002 702/62 |
| 2012/0290230 | A1 * | 11/2012 | Berges Gonzalez ... | G01D 4/004 702/61 |
| 2013/0066479 | A1 | 3/2013 | Shetty et al. | |
| 2013/0179124 | A1 | 7/2013 | Patel et al. | |
| 2013/0191103 | A1 | 7/2013 | Chu et al. | |
| 2013/0204450 | A1 * | 8/2013 | Kagan ..................... | H04L 67/06 700/291 |
| 2015/0046131 | A1 * | 2/2015 | Fei ......................... | G06Q 50/06 703/2 |

OTHER PUBLICATIONS

Zhenyu Guo, Z. Jane Wang and Ali Kashani "Home Appliance Load Modeling from Aggregated Smart Meter Data," in press, IEEE Transactions on Power Systems. DOI: 10.1109/TPWRS.2014.2327041.
G. W. Hart, "Nonintrusive appliance load monitoring," Proc. IEEE, vol. 80, No. 12, pp. 1870-1891, Dec. 1992.
J. Liang, S. Ng,G.Kendall, and J. Cheng, "Load signature study Part I: Basic concept, structure, and methodology," IEEE Trans. Power Del., vol. 25, No. 2, pp. 551-560, Apr. 2010.
J.Liang, S. K. Ng,G.Kendall, and J.W. Cheng, "Load signature study Part II: Disaggregation framework, simulation, and applications," IEEE Trans. Power Del., vol. 25, No. 2, pp. 561-569, Apr. 2010.

(Continued)

*Primary Examiner* — Tesfaldet Bocure
(74) *Attorney, Agent, or Firm* — John R. Flanagan

(57) ABSTRACT

Power consumption related data for the power source supplying an entire household or other group of appliances is captured at a relatively high data rate. The raw data is analyzed to remove redundancy and to identify pertinent features, and then the more informative of these features are then selected. The analysis and selection of features are pre-processing tasks that are performed on-site, on the same piece of hardware that acquires the raw data and transmits the pre-processed data to the server. By transmitting selective data to a remote server, only a low bandwidth is required for the transmission.

18 Claims, 6 Drawing Sheets

(56) References Cited

OTHER PUBLICATIONS

L. R. Rabiner, "A tutorial on hidden Markovmodels and selected applications in speech recognition," Proc. IEEE, vol. 77, No. 2, pp. 257-286, Feb. 1989.

J. Z. Kolter and T. Jaakkola, "Approximate inference in additive factorial HMMs with application to energy disaggregation," in Proc. Int. Conf. Artificial Intelligence and Statistics, 2012, pp. 1472-1482.

O. Parson, S. Ghosh, M. Weal, and A. Rogers, "Non-intrusive load monitoring using prior models of general appliance types," in Proc. 26th AAAI Conf. Artificial Intelligence, 2012.

H. Kim, M. Marwah, M. Arlitt, G. Lyon, and J. Han, "Unsupervised disaggregation of low frequency power measurements," in Proc. SIAM Int. Conf. Data Mining (SDM), 2010.

J. Z. Kolter and M. J. Johnson, "REDD: A public data set for energy disaggregation research," in Proc. SustKDD Workshop Data Mining Applications in Sustainability, 2011, pp. 1-6.

S.-Z. Yu and H. Kobayashi, "Practical implementation of an efficient forward-backward algorithm for an explicit-duration hidden Markov model," IEEE Trans. Signal Process., vol. 54, No. 5, pp. 1947-1951, May 2006.

S.-Z. Yu, "Hidden semi-Markov models," Artif. Intell., vol. 174, No. 4, pp. 215-243, 2010.

International Search Report issued for Patent Cooperation Treaty application No. PCT/CA2015/050108, with a mailing date of May 28, 2015.

Written Opinion issued for Patent Cooperation Treaty application No. PCT/CA2015/050108, with a mailing date of May 28, 2015.

\* cited by examiner

ON-BOARD FEATURE EXTRACTION AND SELECTION FROM HIGH FREQUENCY ELECTRICITY CONSUMPTION DATA

TECHNICAL FIELD

This application concerns a method and device for capturing high frequency data relating to electricity consumption. More specifically, it relates to analyzing and filtering the data, to extract and select the portions of the data that are of more interest, so that they can be transmitted over a connection that may have limited bandwidth.

BACKGROUND

Advances in technology have increased the ability of consumers to monitor their electricity consumption. Electricity sensors are now widely available as consumer electronics, for monitoring the total electricity consumption of a household. Most of the sensors are capable of transmitting sensory data to a cloud service for potential analysis or other usage, but they typically have a data capture rate of 1 Hz or lower. Each sample of data captured may include parameters such as voltage, current, apparent power, reactive power and energy for each individual phase. Most homes have two and some have three phases. When a connection is reliable, the captured data is transmitted evenly, but when the connection is intermittent, the data can be transmitted in batches.

FIG. 1 shows a graph of electricity power consumption based on data captured at a rate of 1 Hz. The x-axis 10 is a measure of time in seconds (t/s) and the y-axis 12 is a measure of power in watts (P/W). The portion 14 of the graph is level, and may correspond to some lights being on, or a router or PVR, for example. At some time between point 16 at 10 seconds and the subsequently captured data point 18 at 11 seconds, another electricity consuming device is switched on and the graph rises linearly 20 due to interpolation between points 16 and 18. The device that is switched on between points 16 and 18 may be a fridge that is cycling to keep cool, a dryer, a chandelier or any other electric or electronic device. After the additional device is on, portion 22 of the graph shows some small fluctuations, which may be due to noise or to changes in the power consumed by the devices that are on. Temperature changes in devices may cause their resistive loads to change during operation, for example. Power, when drawn, may not always fluctuate, though. It could be more noisy if certain devices are on (e.g. TV, computer) but often when the activity at home is limited or not present, the power is fairly flat. The power graph may be obtained from a sensing device that reports the average value of power, current, voltage, etc. every second, as well as the amount of energy that is used over any period of time. While the graph in FIG. 1 is shown as a power graph, it can be safely assumed that a current graph with a 1 Hz resolution would look the same, since the voltage graph would normally be near, or as good as, constant.

Existing systems may be optimized to report data only after the detection of events of interest, such as a turn-on or a turn-off of an electricity consuming device. Also, when a user logs into the app or portal that connects to, and forms part of, the system, the electricity monitoring device may start bursting data at a 1 Hz rate so that users can see immediate responses to their actions. When they log out or leave, the system goes back to event-based transmission.

Some of the sensors in production are capable of sensing AC voltage and current signals with a very high frequency, up to 16.5 KHz in some cases. Besides the monitoring of basic electricity consumption, the sensory data, particularly the high frequency data, may be used for more advanced purposes such as individual load monitoring and user behavior monitoring.

FIG. 2 shows graphs of voltage 30 and current 32 on a common, millisecond time axis 34, which spans one cycle of a 60 Hz electricity supply. Raw data has been recorded at a rate of 16.5 kHz. As it can be seen, there is much more information in this current signal than in the previous power graph. Point 36 may correspond to a switch on of a device, and point 38 may correspond to a switch off of a device, and there may or may not be a device already switched on. Alternately, the rise in current at point 36 and the drop in current at point 38 may be associated with the AC nature of the supply. Nevertheless, the detail of the current graph includes localized maxima 40 and minima 42, which may be indicative of a specific electric or electronic device that is switched on. Detail in the current graph or any other graphs related to power consumption or appliance usage may individually or collectively represent a fingerprint or signature of an appliance. Smaller fluctuations 44 superimposed on a smoothly varying portion of the current graph may simply be noise.

Despite the ability to capture data at higher rates, the low frequency data capture rate has become mainstream due to bandwidth limitations and because of the redundancy existing within high frequency data. For a comparison, sensing data at 1 Hz and transmitting it to a server may require 50 MB/day, taking into account network overhead, whereas sensing and transmitting at 15 kHz would require a bandwidth of 750 GB/day. Even if the higher resolution data were compressed, it would still require, say, 7 GB/day. The bandwidth needed is therefore at least two orders of magnitude less than the bandwidth at which the raw data is received from the sensor.

This background information is provided to reveal information believed by the applicant to be of possible relevance to the present invention. No admission is necessarily intended, nor should be construed, that any of the preceding information constitutes prior art against the present invention, unless explicitly specified.

SUMMARY OF INVENTION

High frequency data of total electricity consumption has been shown to be useful for individual load monitoring and user behavior monitoring, where harmonic analysis, wavelet analysis, and other spectrum analysis can be used to extract patterns relating to different appliances or devices connected to a common supply. Although current sensors in production are technically capable of sensing high frequency electricity data, the huge amount of raw data cannot be transmitted to the cloud and stored properly due to bandwidth limitations. It is, however, not necessary to transmit and store all the high frequency raw data, due to the redundancy of information existing in it. The present invention, therefore, makes good use of the high frequency data while using the current infrastructure with limited bandwidth and storage resources to transmit and store only the most informative of the raw data collected. To achieve this, a certain amount of pre-processing occurs onboard a monitoring device to capture information at higher granularity, without having to report super high-granularity, raw data to the cloud. As a result, much of the networking, processing and storage costs are kept low.

The core of the invention can be divided into (1) feature extraction or abstraction, whereby features are extracted from the raw data and (2) feature selection, whereby the more interesting features are selected. Since this feature processing is done entirely on the sensor hardware and not on a remote server, the volume of data transmitted across the network is kept low, while extra useful information from the high frequency data can be sent utilizing an existing low frequency data communication channel.

This invention provides an effective solution to the problem of transmitting higher resolution data without using the bandwidth that transmission of all the raw data would require. This is done by performing informative and compact feature extraction from the high frequency data, preferably on the same piece of hardware that hosts the data transmission services, and then transmitting only selective data to a remote server at a low bandwidth. Preferably, at least some of the sensor services, such as the receiving of raw sensor data, are also hosted on this same piece of hardware. It is expected that the amount of bandwidth required by an embodiment of the invention would be around 100 MB/day, which is considerably smaller than the amount required for raw or even compressed high resolution data. Additional and/or higher level analytics are then performed at the remote server.

The present invention is directed to a method for monitoring an electricity supply comprising: receiving raw data from a sensor that senses the electricity supply; extracting features from the raw data by calculating feature vectors; selecting feature vectors of interest from the feature vectors; and transmitting the feature vectors of interest to a server. In this method, the extracting may be performed over a predetermined time period; and the feature vectors of interest are selected by choosing those that are different from each other by at least a minimum threshold.

The present invention is also directed to a device for monitoring an electricity supply comprising: an input module configured to receive raw data from a sensor that senses the electricity supply; an extractor module configured to extract features from the raw data by calculating feature vectors; a selector module configured to select feature vectors of interest from the feature vectors; and a communication module configured to transmit the feature vectors of interest to a server.

The present invention is further directed to a system for monitoring an electricity supply comprising (1) a device comprising: an input module configured to receive raw data from a sensor that senses the electricity supply; an extractor module configured to extract features from the raw data by calculating feature vectors; a selector module configured to select feature vectors of interest from the feature vectors; and a communication module configured to transmit the feature vectors of interest; and (2) a server comprising: a processor configured to receive the feature vectors of interest; and non-transitory computer readable media configured to store said feature vectors of interest; wherein the processor is configured to analyze said feature vectors of interest.

BRIEF DESCRIPTION OF DRAWINGS

The following drawings are illustrative of some of the embodiments of the present invention and should not be construed as restricting the scope of the invention in any way.

DESCRIPTION

A. Glossary

Figure 1:
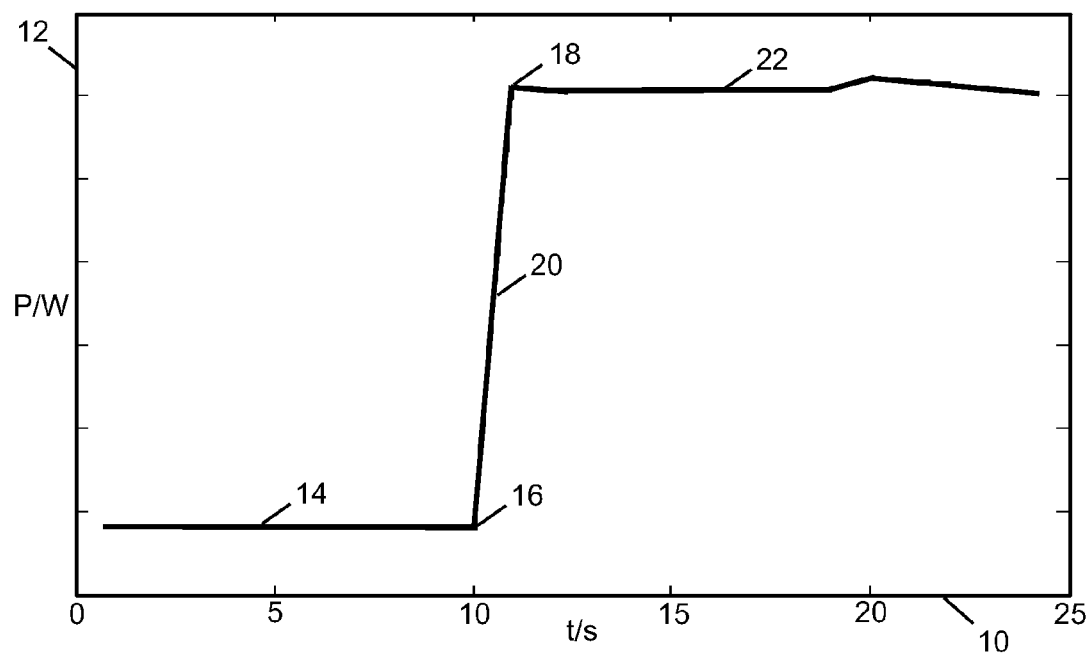
FIG. 1 is a prior art graph of power versus time at a 1 Hz data rate, showing a switch-on event.

Appliance—Any electric or electronic device that is connected to and consumes power from a common electrical power source, including, for example a television, a computer, a battery charger, a fridge, a gaming console, an oven, a hair dryer, a heater, a kettle, etc. In some cases, an appliance may generate power, for example if it is a solar power generator, and may feed back power to the power source. Likewise, an appliance such as an electric vehicle may under some circumstances also provide power to the power source rather than consuming power.

Database—Refers to both persistent and volatile means of storing information suitable for performing computing functions such as searching, inserting and updating. Typically, these are relational databases such as in MySQL. It is also possible to use no-SQL databases, in-memory data structures, plain computer files or any other means of storing data. A database may be a parallel system database in which the processors are tightly coupled and constitute a single database system or may be a distributed database in which storage devices are not all attached to a common processing unit such as a CPU, and is controlled by a distributed database management system. A distributed database system may be stored in multiple computers, located in the same physical location; or may be dispersed over a network of interconnected computers.

Discrete Cosine Transformation (DCT) is a way to represent a finite sequence of discrete data points as a series of cosines of different frequencies, and as such is a form of Fourier transform. There are different types of DCT, and there are many other ways besides DCT to represent a finite sequence of data points. A DCT is used herein as an example of a way in which sequences of current data can be analyzed.

Extremum—A local or global maximum or minimum of a mathematical function or sequence of values. Plural: extrema.

Firmware—Includes, but is not limited to, program code and data used to control and manage the interactions between the various modules of the monitoring device or monitoring system disclosed herein. Firmware persistently stores processor readable instructions and data, which may be updateable.

Hardware—Includes, but is not limited to, the monitoring device and its constituent components, the physical housing for a computer as well as the display screen, connectors, wiring, circuit boards having processor and memory units, power supply, and other electrical components.

Module—can refer to any component in this invention and its network and to any or all of the features of the invention without limitation. Each module may include one or more processors.

Network—Can include both a mobile network and data network without limiting the term's meaning, and includes the use of wireless (e.g. 2G, 3G, 4G, WiFi, WiMAX, Wireless USB, Zigbee™, Bluetooth™ and satellite), and/or hard wired connections such as internet, ADSL, DSL, cable modem, T1, T3, fibre, dial-up modem, and may include connections to flash memory data cards and/or USB memory sticks where appropriate.

Processor—This is used to refer to any electronic circuit or group of circuits that perform calculations, and may include, for example, single or multicore processors, an ASIC, or dedicated circuits that are implemented, for example, on a reconfigurable device such as an FPGA.

Server—Used to refer to any computing device, or group of devices, that provide the functions described herein as being provided by one or more servers.

Software—Includes, but is not limited to, program code that performs the computations necessary for calculating, extracting information, analyzing information, transmitting information, displaying information and managing input and output data. Software can be both internal to the device and external.

B. Monitoring Device

Figure 3:
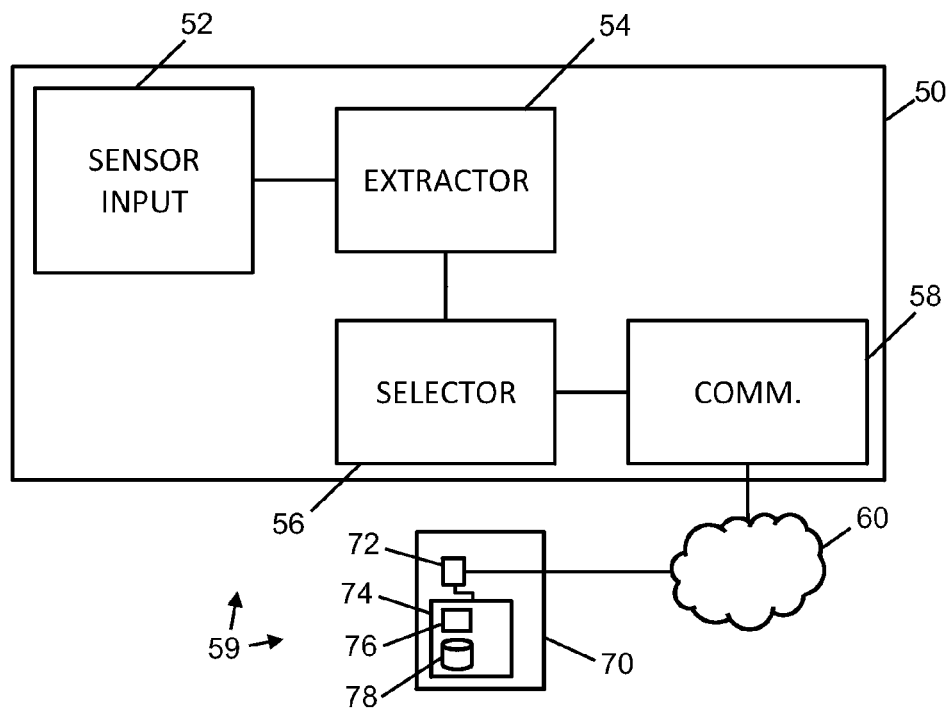
FIG. 3 is a schematic representation of a device and system according to an embodiment of the present invention.

Referring to FIG. 3, a monitoring device 50 according to an embodiment of the present invention is shown. The monitoring device 50 includes a sensor input module 52, an extractor module 54, a selector module 56 and a communication module 58. The monitoring device 50 may form part of a monitoring system 59.

The sensor input module 52 receives, for example, the raw data generated by a current sensor connected to the device. The current sensor may be mounted on the monitoring device 50 or may be wired to it. Such a current sensor may detect current at an elevated data rate, such as 1 kHz, 4.125 kHz or 16.5 kHz. Other data rates within or outside this range are also possible, such as a few hundred Hz or a few tens of Hz. Since the voltage signal changes much less than the current, it is preferable to monitor the current. However, a voltage sensor wired directly between the voltage supply and the sensor input module 52 may be used to provide the input, or another input to the monitoring device 50. The sensor input module 52 may also receive inputs of one or more of power factor, reactive power, apparent power, and energy from one or more sensors.

Figure 2:
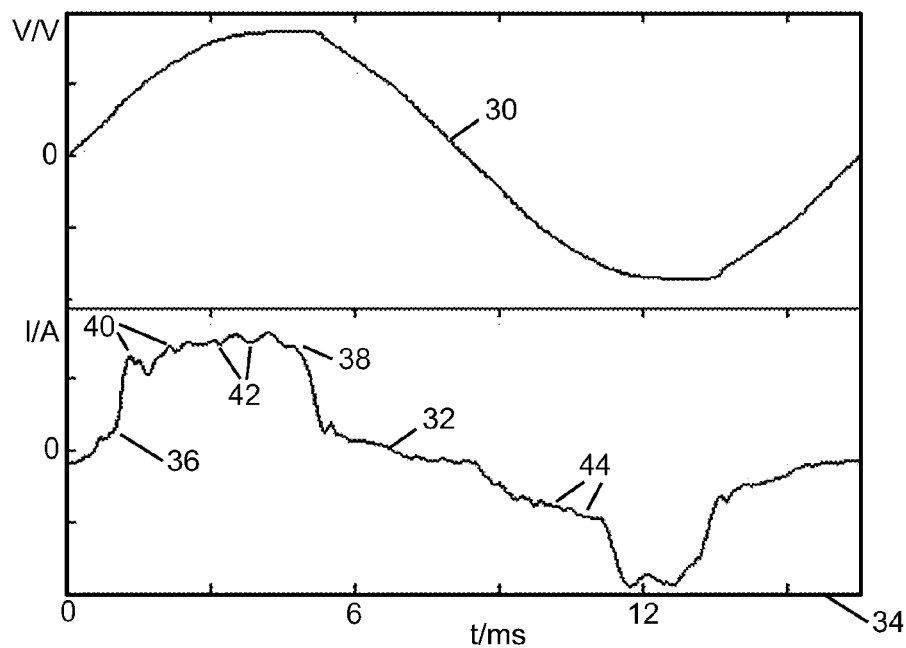
FIG. 2 shows prior art graphs of one cycle of voltage and current versus time at a 16.5 kHz data rate.

The raw data received by the sensor input module 52 is output to the extractor module 54, which analyzes the data by extracting features from it. Such analysis may involve finding the local and/or global extrema in the data over a predetermined time interval, for example one second. For example, referring back to FIG. 2, extrema 40, 42 may be found and identified. The extractor module 54 may express the features as feature vectors, and in one embodiment, there may be sixty feature vectors produced for the one second time interval if the frequency of the supply is 60 kHz and there is one feature vector per supply cycle. Statistical signal processing, spectrum analysis or any proprietary or other feature extraction method may be applied to the received data in order to produce parameters to be included in the feature vectors. Before analysis, data from high frequency sensors may be optionally be downsampled.

A feature vector produced by the extractor module 54 may include, for example, a timestamp; the locations of zero, one or more local extrema; the values of zero, one or more local extrema; the magnitude of local extrema compared to neighboring regions of data; the widths of local extrema; the signs of the local extrema; the locations of zero, one or two global extrema; the values of zero, one or two global extrema; a standard deviation; an average; or any other characteristic or value of a parameter that could be indicative or identifiable. The neighboring regions of data either side of the local extrema that are taken into account may be one or more data points wide. Furthermore, the time interval may be other than one second, and may not necessarily correspond to exactly one supply cycle. For example, the time interval may be 5, 10 or 30 seconds or a fraction of a second. A specific example of a simple feature vector that represents a local maxima is:

[start: relative timestamp;
end: relative timestamp;
magnitude: 2 A;
sign: +1]

Here, relative timestamps are based on the absolute timestamp of the start of the time interval that is being sampled. A feature vector could cover several milliseconds of the raw data or a single point, particularly if there is a peak point in the current graph.

Given the relative timestamp of the feature vectors, we can infer the phase shift of the current signal, which can give us more detailed power factors for each supply cycle (in a 60 Hz supply, we could have 60 power factors). Phase shift may be due to inductive or reactive components of loads. The rate of increase or decrease of current extrema may reflect the response time of certain loads, which may in turn be used to distinguish different appliances.

Feature vectors may be calculated for all data received by the sensor input module 52, or only some of it, depending on the embodiment used. There may be zero, one or numerous feature vectors within a one second interval, or even within one cycle of the supply. The feature vectors may be used to identify specific appliances or the behavior of the people using appliances that are connected to the supply that is being monitored.

The selector module 56 is configured to select feature vectors of interest from the ones that have been extracted from the raw data. The feature vectors that are selected may be those showing the greatest contrast compared to a running average, those that contain a value or values above a predetermined threshold, those that contain a value that is the maximum or minimum within an immediately preceding preset interval of time, those that conform to a certain pattern, a certain fraction of the feature vectors, or any other criterion that can be defined or learnt. For example, for load identification tasks, the most discriminative feature vectors will be selected. This could be done by extracting the feature vectors over successive predetermined time periods, and then, from the feature vectors within each period, choosing those that are different from each other by at least a minimum threshold. The minimum threshold may be one or more different parameters or characteristics of the feature vectors. For health monitoring tasks, feature vectors related to abnormal behaviors will be selected, such as those that do not conform to an expected pattern, template or range.

One thing worth pointing out is that during steady states when there is nothing being turned on or off, there will be similar feature vectors for each cycle of the current signal. The selector module 56 may filter out these feature vectors since they correspond to a 'non-event' period. Such filtering may be done by examining the difference between consecutive feature vectors, and if the difference is below a predetermined threshold, then the latter feature vector will not be selected.

Feature vectors are not necessarily meaningful to the monitoring device 50. Rather, the monitoring device 50 focuses on extracting useful or potentially useful information from the huge amount of raw data that is generated by high frequency sensors connected to the sensor input module 52. There may be two devices A and B connected to the supply that is being monitored, where the turn on event of A produces feature vector (f1, f2, f5, f5, f5, f5, f6) and the turn on event of B produces feature vector (f2, f2, f2, f2, f5, f2, f1). These feature vectors can be extracted from the raw data and then selected by the selector module 56, without the selector module knowing what appliances and/or behaviour they specifically represent. The start and end of a feature vector may be defined by a reporting period. Alternately, events of interest are detected when a significant change in the sensed current signal occurs, at which point a feature vector will start. The feature vector will then end when the current signal settles.

As well as turn-on events, feature vectors may also be indicative of normal operation of an appliance, different operation modes of a appliance, and switching off of a device. Different appliances will typically have different noise signatures. Since a typical home appliance may take up to two seconds to fully switch on, it does not matter, in these cases, where in the cycle the appliance is first switched on. As the time to reach full switch on lasts over a hundred cycles, many of them will be the same.

Feature vectors may be separate from each other, or they may be overlapping. The device 50 will not necessarily identify that two feature vectors are overlapping, but will detect the overlapped pair as a single feature vector, for example.

After the feature vectors have been selected by the selector module 56, they are transmitted from the monitoring device 50 by the communication module 58. Transmission may be via network 60 to a local or remote server 70, which, together with the monitoring device 50, may form part of a monitoring system 59, the monitoring system being an embodiment of the present invention. The feature vectors may be transmitted through wireless radio, for example either Zigbee™ or Wifi. The monitoring server 70 may contain one or more processors 72 and one or more types of computer readable memory 74. The memory 74 may store computer readable instructions 74 that are executable by the processor(s) 72, and computer readable data 78, also readable by the processor(s). The server 70 may be configured to store the feature vectors received from the communication module 58, further analyze the feature vectors, prepare the feature vectors for display, associate feature vectors with appliances, learn what the feature vectors represent, as well as many other functions related to the higher level processing, treatment and analysis of the feature vectors. For example, the feature vectors sent to the server 70 can be used by the server to distinguish the turn-on events of A and B. Another example is that the server may be configured to look at permutations of known feature vectors stored in a database (e.g. within data 78) in order to determine which feature vectors are in an overlapped pair.

Data transmission may occur every second, as is the case for the mainstream systems, but additional data containing selected feature vectors may also be included and transmitted at the same time as more conventional low data-rate information. The data package to be transmitted may be compressed, in whole or in part. Many types of compression would be suitable. In other embodiments, data packages may be transmitted upon the occurrence of events of interest. In some embodiments, data may be transmitted every 10 seconds (0.1 Hz), or every minute (0.016 Hz), or in some cases less frequently.

Communication may be two way, in that a web socket may be used to set the monitoring device 50 to different modes or configurations, such as switching the task from load monitoring to health monitoring, or to update the thresholds of feature selection.

C. Exemplary Feature Vectors

Figure 4:
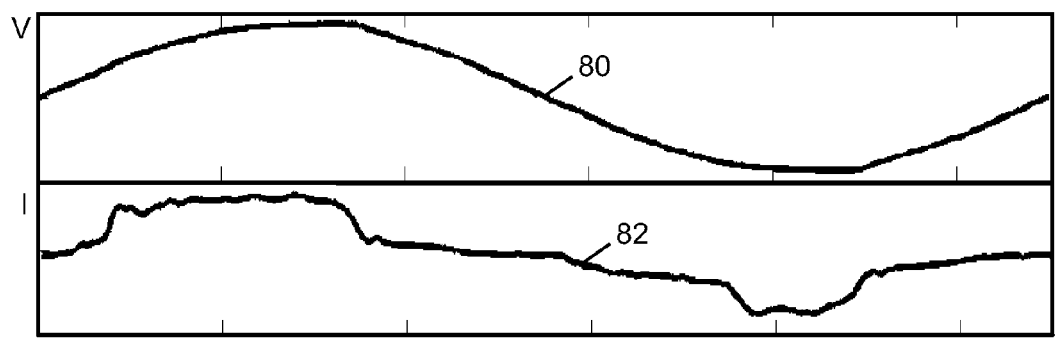
FIG. 4 shows a 60 Hz cycle of corresponding voltage and current values captured at a data rate of 16.5 kHz.
Figure 5:
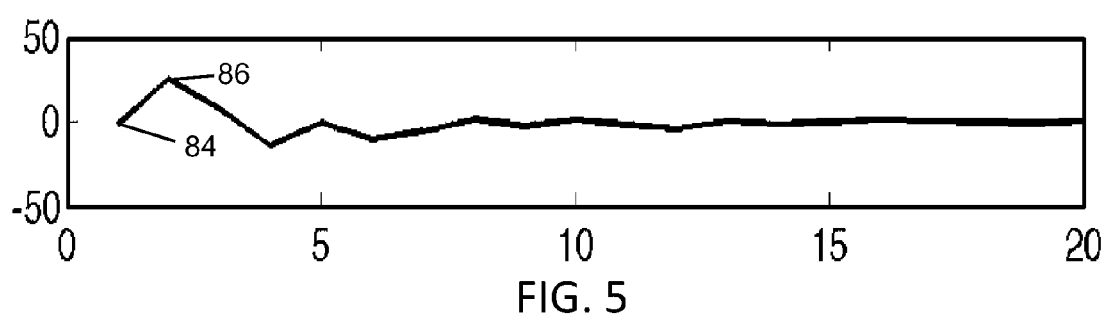
FIG. 5 is a graphical representation of DCT (Discrete Cosine Transform) coefficients for the current graph of FIG. 4.

FIG. 4 shows a single 60 Hz cycle of corresponding voltage (V) and current (I) values captured with a high frequency sensor operating at a data rate of 16.5 kHz. One way in which features may be abstracted from these series of values is to perform a DCT analysis on them. For example, the result of DCT analysis in which the first twenty DCT coefficients are retained will be a feature vector which looks like the following for the current data of FIG. 4: [1302985902, 3, (−1.66, 25.38, 7.67, −14.22, −0.68, −10.58, −5.42, 1.43, −2.80, 1.28, −1.90, −4.21, 0.14, −1.48, −0.12, 1.27, 0.14, −0.40, 1.13, 0.35)]. Here, the first element of the feature vector is a timestamp of the start of the one-second time interval during which the feature vector was extracted. The timestamp may be generated by a Unix™ timestamp converter (UTC), for example, or it may be another representation of coordinated universal time. The second element is the cycle count within the one-second interval. The third element is a vector of dimension 1×20, representing the first twenty DCT coefficients. FIG. 5 is a graphical representation of the first twenty DCT coefficients for the current graph of FIG. 4. For example, point 84 represents the first DCT coefficient and point 86 represents the second DCT coefficient. There are sixty such feature vectors for the one-second interval. Most of the time, particularly if there is no event happening, the DCT coefficients in the sixty vectors are likely to be quite similar, and the monitoring device 50 would only report one of them to the server 70. This is one of the many possibilities of feature selection, or filtering, as provided by the feature selector module.

Figure 6:
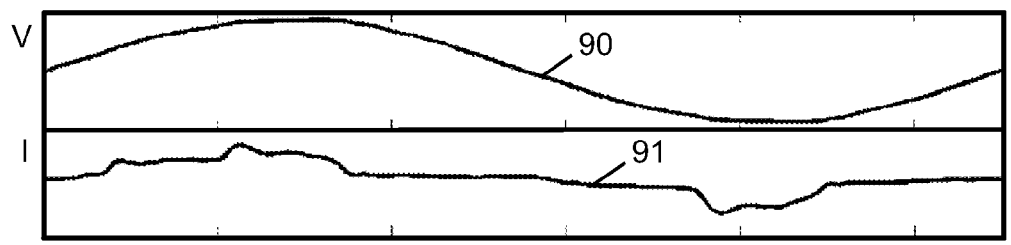
FIG. 6 shows a 60 Hz cycle of corresponding voltage and current values captured at a data rate of 16.5 kHz.
Figure 7:
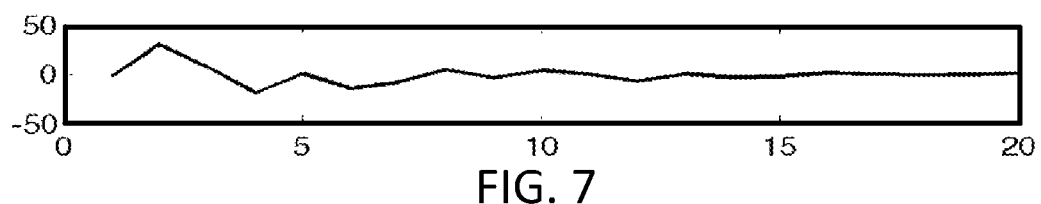
FIG. 7 is a graphical representation of DCT coefficients for the current graph of FIG. 6.

Similarly, FIG. 6 shows corresponding voltage (V) and current (I) values for another cycle. The feature vector for this cycle, calculated in the same way, is: [1302988948, 40, (−1.82, 30.32, 7.54, −18.63, 0.79, −14.06, −8.27, 4.62, −3.03, 4.12, 0.00, −6.70, 0.62, −2.69, −2.14, 1.52, 0.14, −0.84, −0.30, 1.27)]. A graphical representation of this feature vector is shown in FIG. 7.

Figure 8:
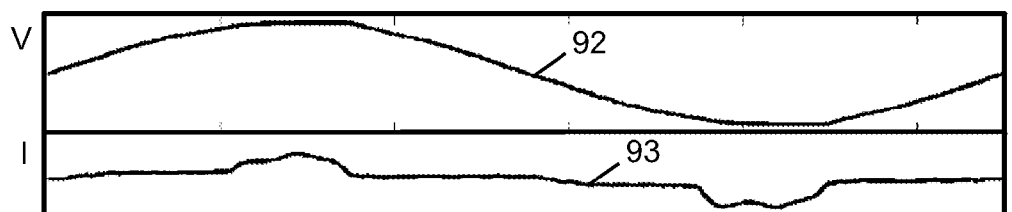
FIG. 8 shows a 60 Hz cycle of corresponding voltage and current values captured at a data rate of 16.5 kHz.
Figure 9:
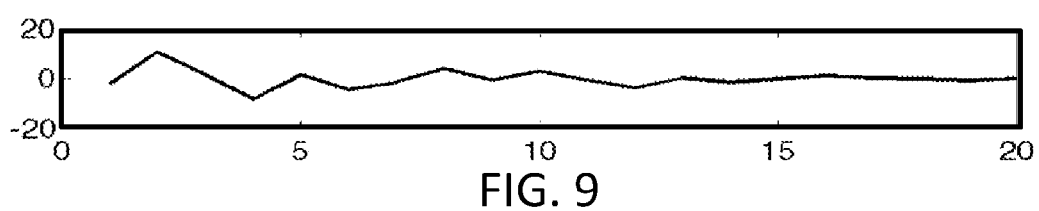
FIG. 9 is a graphical representation of DCT coefficients for the current graph of FIG. 8.

FIG. 8 shows corresponding voltage (V) and current (I) values for yet another cycle. The feature vector for this cycle, calculated in the same way, is: [1303005331, 4, (−2.07, 10.54, 1.54, −8.37, 1.44, −4.49, −1.50, 3.99, −0.54, 2.88, −0.56, −3.76, 0.19, −1.48, −0.05, 1.15, 0.32, −0.16, −0.84, 0.01)]. A graphical representation of this feature vector is shown in FIG. 9.

Figure 10:
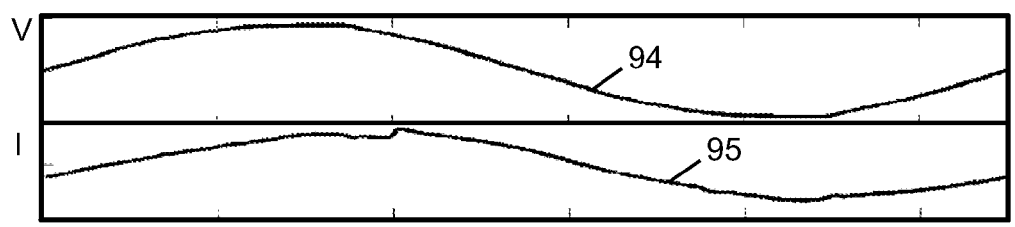
FIG. 10 shows a 60 Hz cycle of corresponding voltage and current values captured at a data rate of 16.5 kHz.
Figure 11:
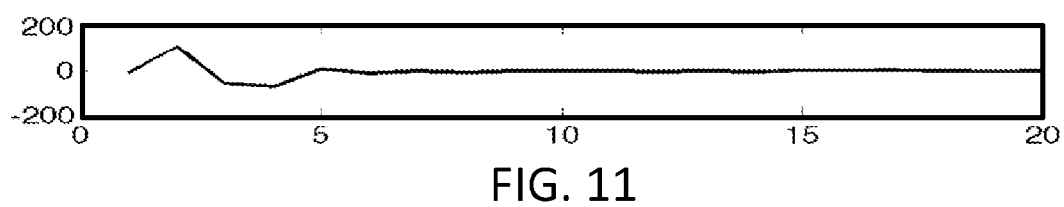
FIG. 11 is a graphical representation of DCT coefficients for the current graph of FIG. 10.

FIG. 10 shows corresponding voltage (V) and current (I) values for still another cycle. The feature vector for this cycle, calculated in the same way, is: [1303005348, 40, (−8.15, 107.97, −56.64, −71.72, 8.88, −11.40, −1.33, −7.71, −1.28, −0.27, −0.58, −4.35, −0.71, −4.67, 0.95, 0.62, 1.77, −1.73, −3.31, −1.40)]. A graphical representation of this feature vector is shown in FIG. 11.

Figure 12:
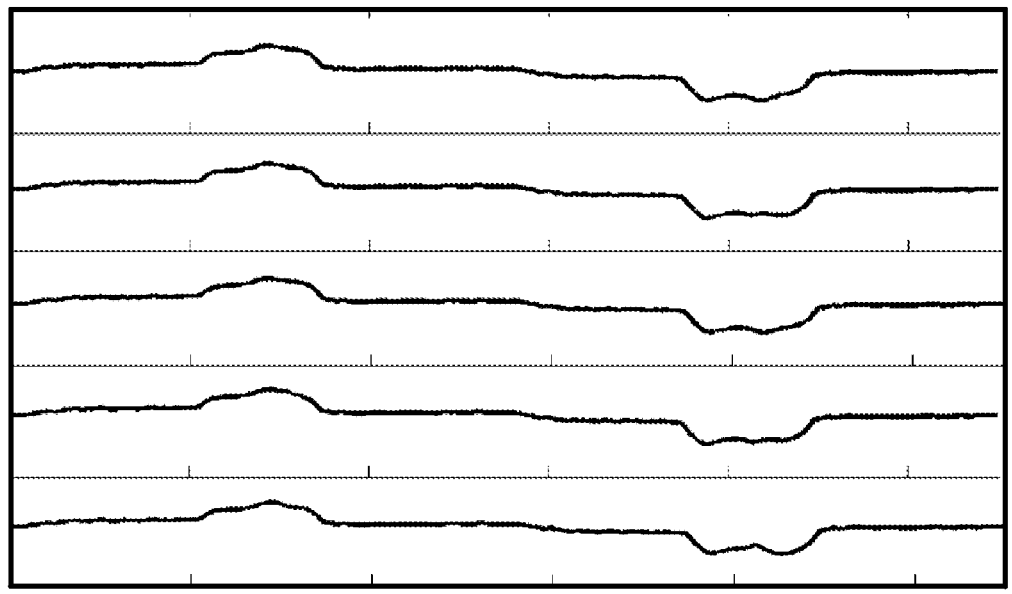
FIG. 12 shows graphs of five similar 60 Hz cycles of current values captured at a data rate of 16.5 kHz.
Figure 13:
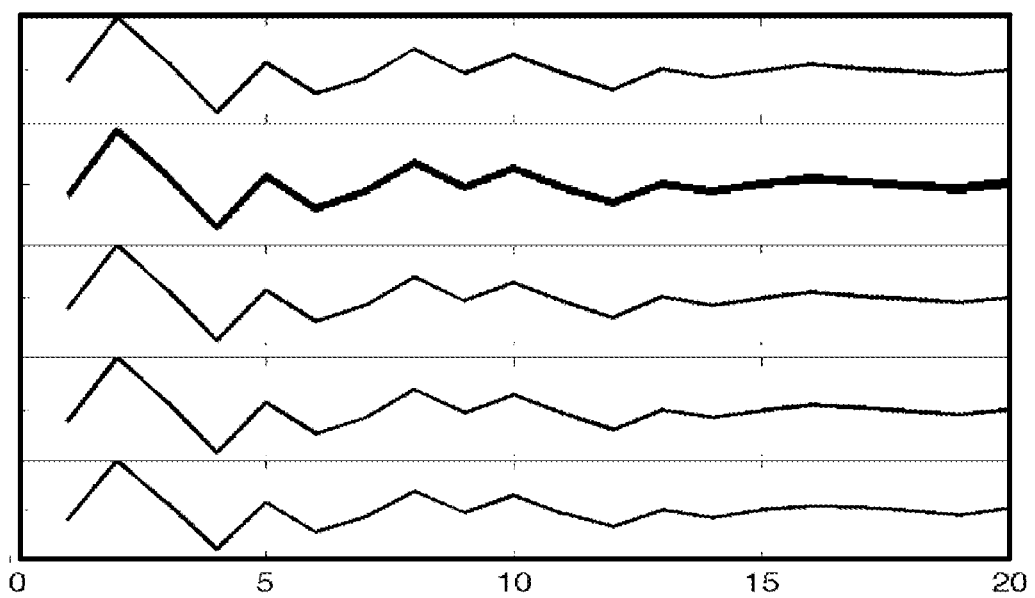
FIG. 13 is a graphical representation of DCT coefficients for the current graphs of FIG. 12.

The above current graphs, as shown in FIGS. 4, 6, 8 and 10, have variations that may be considered to be significant, and therefore may represent different appliances being on. In contrast, FIG. 12 shows graphs of five similar 60 Hz cycles of current values, which are again captured at a data rate of 16.5 kHz. FIG. 13 is a graphical representation of the first twenty DCT coefficients corresponding to each of the current graphs of FIG. 12. Slight differences may be discernable by eye, but a processor based analysis will calculate the differences accurately.

Figure 14:
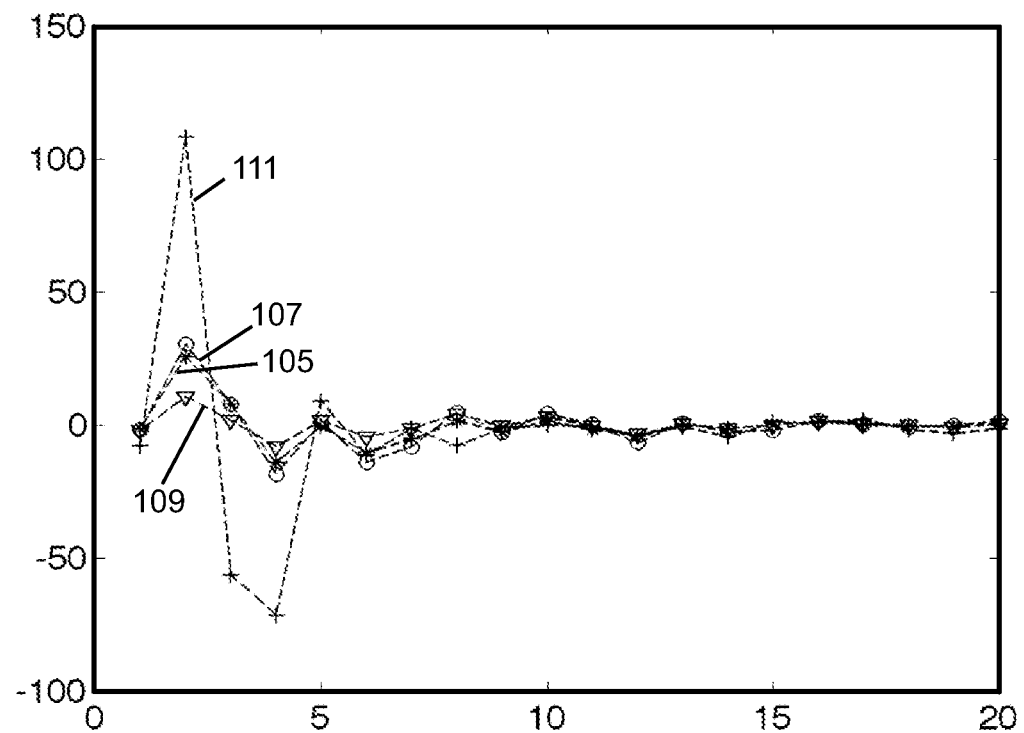
FIG. 14 is a comparison of the DCT coefficients in FIGS. 5, 7, 9 and 11.

FIG. 14 is a graphical comparison of the DCT coefficients 105, 107, 109, 111 of FIGS. 5, 7, 9 and 11 respectively, showing that there are some significant differences between them. Each feature vector may represent a different appliance, or a different combination of appliances. Depending on the threshold levels set in the feature selector module 56, one of the feature vectors 105, 107 may be filtered out as being redundant, if they are captured consecutively or within a brief period of time.

Figure 15:
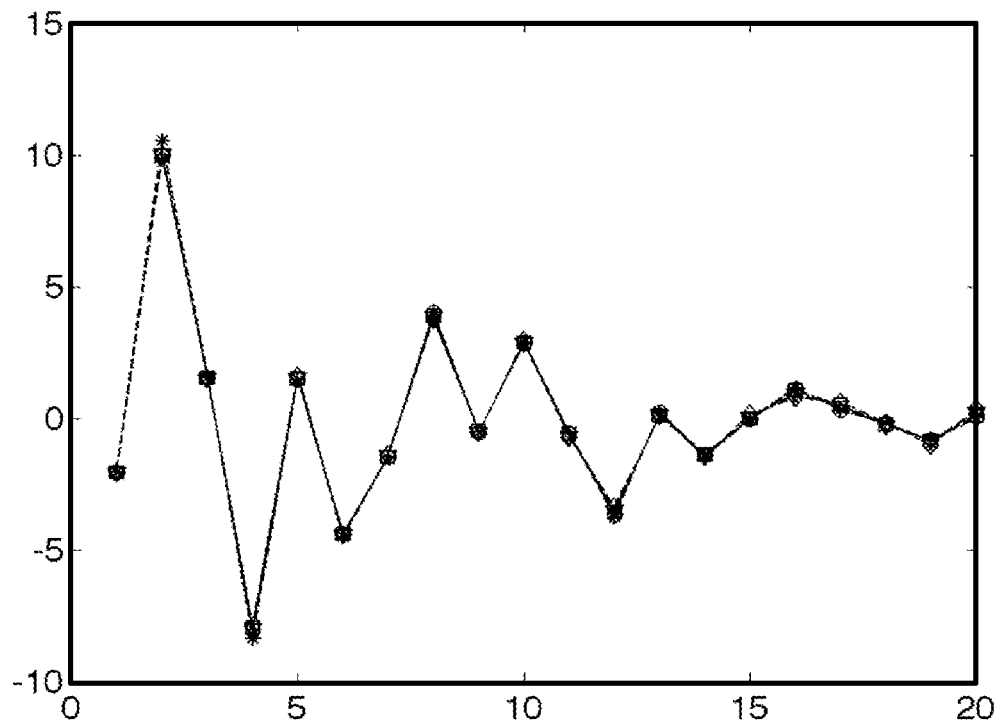
FIG. 15 is a comparison of the DCT coefficients in FIG. 13.

FIG. 15 is a graphical comparison of the DCT coefficients in FIG. 13. As can be seen, there is little difference between them, so all but one of them will be filtered out by the feature selector module 56, if they are extracted successively or within a limited period of time. If they are extracted at different times, then they may all be relevant and indicative of the same appliance being on at different times. Such load identification would be performed by further, higher level analysis and matching of the feature vectors at the server 70.

Figure 16:
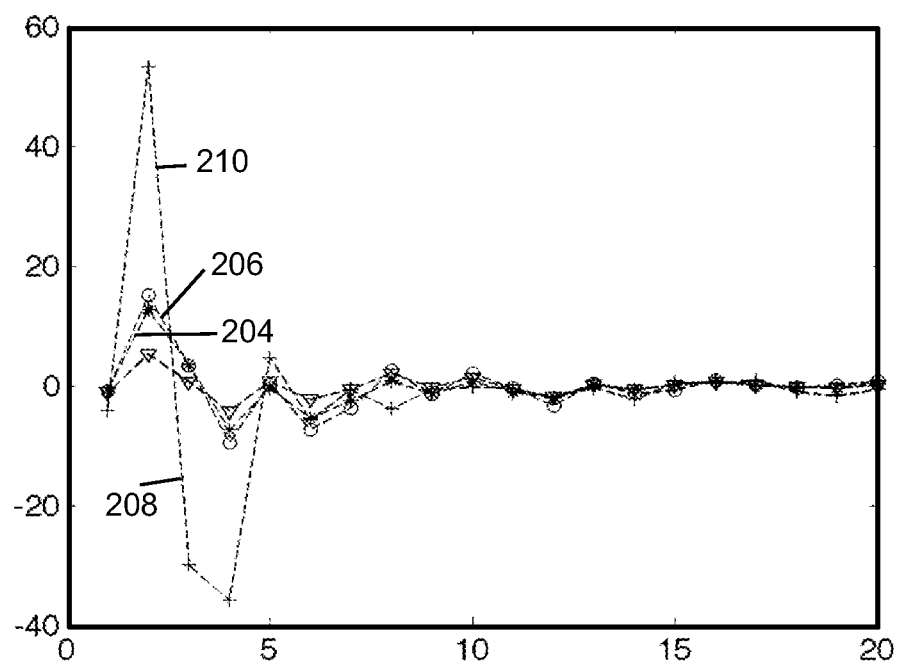
FIG. 16 is a comparison of DCT coefficients for a 4.125 kHz sampling of the currents in FIGS. 4, 6, 8 and 10.

FIG. 16 is a comparison of DCT coefficients 204, 206, 208, 210 calculated for a 4.125 kHz sampling of the same currents signals that provided the graphs in FIGS. 4, 6, 8 and 10 respectively. As can be seen, there is little qualitative difference between this comparison and that of FIG. 14, which derived from output from a 16.5 kHz sensor. The main difference is in the magnitudes of the DCT coefficients.

Figure 17:
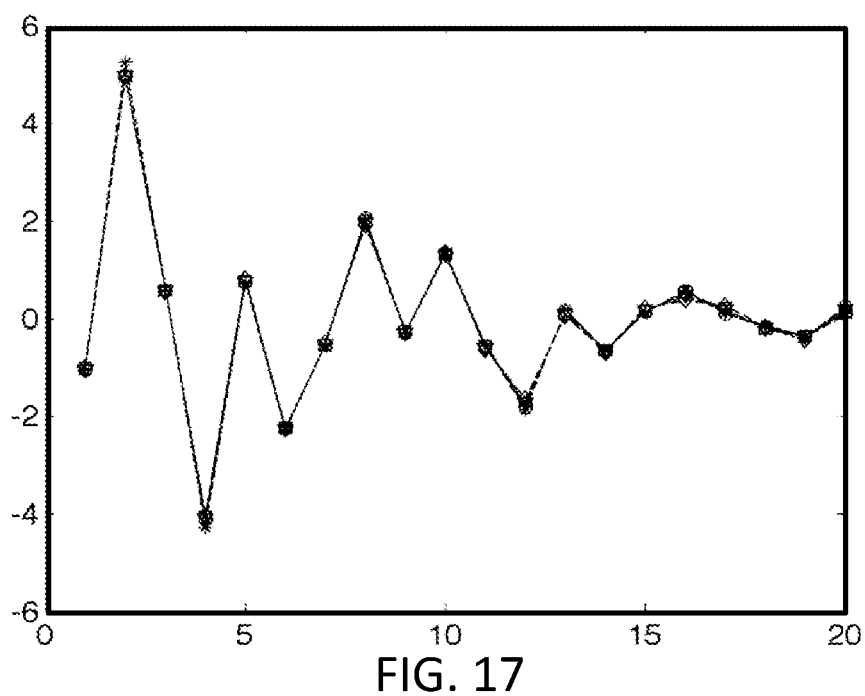
FIG. 17 is a comparison of DCT coefficients for a 4.125 kHz sampling of the currents in FIG. 12.

FIG. 17 is a comparison of DCT coefficients calculated for a 4.125 kHz sampling of the currents that provided FIG. 12. As can be seen, and as above, there is little qualitative difference between this comparison and that of and FIG. 15, which derived from output from a 16.5 kHz sensor. As above, the main difference is in the magnitudes of the DCT coefficients.

D. Exemplary Method

Figure 18:
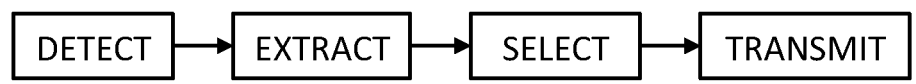
FIG. 18 is a flowchart of a method according to an embodiment of the present invention.

FIG. 18 is a flowchart of the main steps of a method according to an embodiment of the present invention. In step 250 a signal is detected at an elevated data rate, such as between 1 kHz and 20 kHz, although data rates outside this range are possible. An elevated data rate is a rate that is significantly higher than 1 Hz, for example, more than about two orders of magnitude. In step 252, features are extracted from the detected signal. Many different techniques are possible for extracting features from the signal, but all will result in key parameters of the raw data signal being represented in a more compact form than if the data were left as-is. In step 254, the most informative of the features are extracted. The extraction of features involves the recognition and representation of the features that are potentially useful for higher level analysis, without necessarily knowing what the features will correspond to as a result of such higher level analysis. In step 256, the selected features are transmitted using a relatively low bandwidth to a server for the higher level analysis. The bandwidth required for the transmission is low compared to the bandwidth that would be required if the raw data were to be transmitted without any pre-processing such as feature extraction or feature selection.

E. Variations

The present description is of the best presently contemplated mode of carrying out the subject matter disclosed and claimed herein. The description is made for the purpose of illustrating the general principles of the subject matter and not to be taken in a limiting sense; the subject matter can find utility in a variety of implementations without departing from the scope of the disclosure made, as will be apparent to those of skill in the art from an understanding of the principles that underlie the subject matter.

The detailed descriptions within have been presented largely in terms of methods or processes, symbolic representations of operations, functionalities and features of the invention. These method descriptions and representations are the means used by those skilled in the art to most effectively convey the substance of their work to others skilled in the art. A software, firmware or hardware implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions. The code modules may be stored in any type(s) of computer-readable media or other computer storage system or device (e.g., hard disk drives, solid state memories, etc.). The methods may be embodied partly or wholly in specialized computer hardware, such as ASIC or FPGA circuitry. The results of the disclosed methods and tasks may be persistently stored by transforming physical storage devices, such as solid state memory chips and/or magnetic disks, into a different state.

Throughout the description, specific details have been set forth in order to provide a more thorough understanding of the invention. However, the invention may be practiced without these particulars. In other instances, well known elements have not been shown or described in detail to avoid unnecessarily obscuring the invention. In general, unless otherwise indicated, singular elements may be in the plural and vice versa with no loss of generality. Accordingly, the specification and drawings are to be regarded in an illustrative, rather than a restrictive, sense.

It will be clear to one having skill in the art that variations to the specific details disclosed herein can be made, resulting in other embodiments that are within the scope of the invention disclosed. Steps in the methods may have other steps added, or one or more steps may be removed without altering the main function of the system. All parameters, dimensions, materials, and configurations described herein are examples only and actual values of such depend on the specific embodiment.

The disclosed invention is applicable to frequencies other than 60 Hz, such as 50 Hz, and to other supply voltages, such as 220V or 240V. The device may receive data from multiple sensors, each one for a different phase of the supply. The device could be used for businesses as well as households, particularly small and medium businesses.

The scope of the invention is therefore to be construed in accordance with the substance defined by the following claims.

The invention claimed is:

1. A method for monitoring an electricity supply comprising:
  receiving raw data from a sensor that senses the electricity supply;

extracting features from the raw data by calculating feature vectors, wherein the extracting is performed over successive predetermined time periods and the feature vectors each comprise:
- a timestamp identifying the time period during which the feature vector was extracted; and
- a number indicating a cycle of electricity that was supplied within the identified time period and to which the feature vector relates;

selecting feature vectors of interest from the feature vectors; and transmitting the feature vectors of interest to a server.

2. The method of claim 1 wherein the raw data is received at a data rate of 100 Hz or above.

3. The method of claim 1, wherein the electricity supply is a household electricity supply.

4. The method of claim 1, wherein the electricity supply is a business electricity supply.

5. The method of claim 1, wherein the raw data is electrical current data.

6. The method of claim 1, wherein the raw data includes one or more of power factor; reactive power; apparent power; voltage; and energy.

7. The method of claim 1, wherein said receiving, extracting, selecting and transmitting are performed on a common piece of hardware.

8. The method of claim 1, wherein the feature vectors of interest are transmitted at a rate between once per minute to 1 Hz.

9. The method of claim 1, wherein said transmitting requires a bandwidth no greater than two orders of magnitude less than a bandwidth required to receive the raw data.

10. The method of claim 1, wherein the feature vectors each comprise at least one extrema.

11. The method of claim 1, wherein:
the feature vectors of interest are selected by choosing those that are different from each other by at least a minimum threshold.

12. The method of claim 1, wherein the selection of feature vectors of interest is performed according to an instruction received from the server.

13. The method of claim 1, wherein the data is received from two or more sensors, each sensor providing raw data from a different phase of the electricity supply.

14. The method of claim 1, wherein the extraction of feature vectors is performed by carrying out discrete cosine transformations on the raw data.

15. A device for monitoring an electricity supply comprising:
an input module configured to receive raw data from a sensor that senses the electricity supply;
an extractor module configured to extract features from the raw data by calculating feature vectors, wherein
the extractor module extracts features over successive predetermined time periods; and
the feature vectors each comprise:
- a timestamp identifying the time period during which the feature vector was extracted; and
- a number indicating a cycle of electricity that was supplied within the identified time period and to which the feature vector relates;
a selector module configured to select feature vectors of interest from the feature vectors; and
a communication module configured to transmit the feature vectors of interest to a server.

16. The device of claim 15 wherein:
the raw data is electrical current data;
the input module receives the raw data at a data rate of 100 Hz or above;
the electricity supply is a household electricity supply; and
the feature vectors each comprise at least one extrema.

17. The device of claim 15, wherein:
the selector module selects feature vectors of interest by choosing those that are different from each other by at least a minimum threshold.

18. A system for monitoring an electricity supply comprising:
a device comprising:
an input module configured to receive raw data from a sensor that senses the electricity supply;
an extractor module configured to extract features from the raw data by calculating feature vectors, wherein
the extractor module extracts features over successive predetermined time periods; and
the feature vectors each comprise:
- a timestamp identifying the time period during which the feature vector was extracted; and
- a number indicating a cycle of electricity that was supplied within the identified time period and to which the feature vector relates;
a selector module configured to select feature vectors of interest from the feature vectors; and
a communication module configured to transmit the feature vectors of interest; and
a server comprising:
a processor configured to receive the feature vectors of interest; and
non-transitory computer readable media configured to store said feature vectors of interest;
wherein the processor is configured to analyze said feature vectors of interest.

* * * * *